(12) United States Patent
Sivertsen (10) Patent No.: US 8,671,292 B2
(45) Date of Patent: *Mar. 11, 2014

(54) ETHERNET POWERED COMPUTING DEVICE AND SYSTEM

(75) Inventor: Clas Gerhard Sivertsen, Lilburn, GA (US)

(73) Assignee: American Megatrends, Inc., Norcross, GA (US)

(*) Notice: Subject to any disclaimer, the term of this patent is extended or adjusted under 35 U.S.C. 154(b) by 50 days.

This patent is subject to a terminal disclaimer.

(21) Appl. No.: 13/182,308

(22) Filed: Jul. 13, 2011

(65) Prior Publication Data

US 2011/0271125 A1 Nov. 3, 2011

Related U.S. Application Data

(63) Continuation of application No. 11/498,295, filed on Aug. 2, 2006, now Pat. No. 8,006,104.

(51) Int. Cl.

| | |
|---|---|
| G06F 1/00 | (2006.01) |
| H01R 13/46 | (2006.01) |
| H01K 5/00 | (2006.01) |
| H01H 9/02 | (2006.01) |
| H01H 13/04 | (2006.01) |
| H01H 19/04 | (2006.01) |
| H01H 21/04 | (2006.01) |
| H01H 23/04 | (2006.01) |
| H02G 3/08 | (2006.01) |
| G06F 1/16 | (2006.01) |
| H05K 5/00 | (2006.01) |
| G05B 11/01 | (2006.01) |

(52) U.S. Cl.
USPC .............. 713/300; 174/520; 174/53; 174/58; 220/3.5; 361/679.02; 700/13

(58) Field of Classification Search
USPC .......... 713/300; 174/520, 53, 58; 361/679.02; 220/3.5
See application file for complete search history.

(56) References Cited

U.S. PATENT DOCUMENTS

| 5,241,283 A | 8/1993 | Sutterlin |
| 6,104,451 A | 8/2000 | Matsuoka et al. |

(Continued)

OTHER PUBLICATIONS

U.S. Official Office action dated Jun. 23, 2009 in U.S. Appl. No. 11/517,975.

(Continued)

Primary Examiner — Kim Huynh
Assistant Examiner — Brandon Kinsey
(74) Attorney, Agent, or Firm — Morris Manning & Martin, LLP; Tim Tingkang Xia, Esq.

(57) ABSTRACT

Apparatus and systems provide processing capabilities while utilizing power received via an Ethernet. A computing device has an Ethernet connector for receiving power and data, internal power supply circuitry for extracting power from the Ethernet connector, and a Central Processing Unit (CPU) for receiving the power. A housing may encompass the components of the computing device and be configured for installation in an electrical wall box. The housing may include a display or connectors for peripherals. A system includes at least two computing devices. Each device has an Ethernet connector for receiving power and communicating with other devices and are installed within a housing within an electrical wall box. One device has a display for receiving user input instructions for transmittal to another device, while another device has a peripheral connector for controlling a peripheral according to the instructions.

9 Claims, 9 Drawing Sheets

(56) References Cited

U.S. PATENT DOCUMENTS

| | | |
|---|---|---|
| 6,246,573 B1 | 6/2001 | Khan et al. |
| 6,674,458 B1 * | 1/2004 | Cohen-Solal et al. ..... 348/14.08 |
| 6,798,341 B1 | 9/2004 | Eckel et al. |
| 6,967,565 B2 | 11/2005 | Lingemann |
| 7,394,451 B1 | 7/2008 | Patten et al. |
| 7,522,065 B2 | 4/2009 | Falcon |
| 7,608,948 B2 | 10/2009 | Nearhoof et al. |
| 8,006,104 B1 * | 8/2011 | Sivertsen ..................... 713/300 |
| 8,006,105 B1 | 8/2011 | Sivertsen |
| 2002/0021288 A1 | 2/2002 | Schug |
| 2003/0122625 A1 | 7/2003 | Sutterlin et al. |
| 2005/0110740 A1 | 5/2005 | Linzmeier et al. |
| 2005/0125083 A1 | 6/2005 | Kiko |
| 2005/0264981 A1 | 12/2005 | Anderson et al. |
| 2006/0038662 A1 | 2/2006 | White et al. |
| 2006/0185876 A1 | 8/2006 | Aviv |
| 2006/0185877 A1 | 8/2006 | Soffer |
| 2007/0256105 A1 | 11/2007 | Tabe |
| 2007/0263855 A1 | 11/2007 | Martich et al. |
| 2007/0271383 A1 | 11/2007 | Kim et al. |
| 2008/0218493 A1 | 9/2008 | Patten et al. |

OTHER PUBLICATIONS

U.S. Appl. No. 11/517,975, filed Sep. 8, 2006, entitled "AC-Powered In-Wall Computing Device With Power-Line Networking Capabilities" inventor Clas Gerhard Sivertsen.

* cited by examiner

ETHERNET POWERED COMPUTING DEVICE AND SYSTEM

CROSS-REFERENCE TO RELATED PATENT APPLICATION

This application is a continuation of, and claims benefit of U.S. patent application Ser. No. 11/498,295, filed Aug. 2, 2006, now U.S. Pat. No. 8,006,104 entitled "ETHERNET POWERED COMPUTING DEVICE AND SYSTEM" by Clas Gerhard Sivertsen, which status is allowed, the disclosure of which is incorporated herein by reference in its entirety.

TECHNICAL FIELD

The present invention relates generally to the field of personal computers (PCs) as related to power systems, networking, and configurations. More specifically, the disclosure presented herein relates to the field of utilizing Ethernet-provided power within a PC or networked PCs in stand-alone or flush wall-mounted configurations.

BACKGROUND

Personal and embedded computers today exist in a variety of common form-factors, such as standard towers, desktops, racks, and various size laptops. Computer motherboards and embedded systems are also available as bare circuit board assemblies in some typical form factors such as ATX and PC-104. Common for these systems are that they require an external power adapter or a power supply to operate.

Computer systems often communicate through Ethernet, and many computers and embedded systems are outfitted with Ethernet ports. These ports typically consist of one or more 8-pin RJ-45 connectors. There are 4 twisted pairs of wire in Ethernet, where as typically only two of the pairs are used for data communication. Power over Ethernet (PoE) technology allows unused pairs of the Ethernet cable to carry power to networked devices. Typically the hubs in the network or power injector devices provide power on the network wires. PoE is currently used in limited applications to provide power to certain peripheral devices, such as security cameras. One can easily imagine the advantage of powering cameras over the network wire for security applications, where only one cable is needed from the hub to the device carrying both data and power.

Conventional Personal Computers and Embedded systems require a variety of voltages supplied to power the various parts of a product, such as +/−12V, 5V, 3.3V, 1.8V, and 1.5V. These voltages are typically provided by a power supply external to the main circuit board of the product, which takes up space, requires additional cabling and generates heat.

In homes and businesses it is common to use electrical boxes in walls, ceilings and exteriors. These boxes come in a variety of mounting styles depending on where and how they are installed and what connections they need to make. Often referred to as "gang-boxes", these devices typically come in a standard height, and a variety of depths and widths. Gang-boxes are available in a number or integer combinations, where a single gang can host one device, a double-gang can host two devices, a triple-gang can host three devices, and so forth. This is a useful and flexible way of combining controlling devices such as light switches, dimmers, wall-outlets, and other devices.

Wall-plates are typically used as a cover for the gang-boxes. They come in a variety of colors, cosmetic textures and with various ornamental motives. There are also wall-plates made for various interfaces such as mechanical light switches, wall-outlets, RJ-45 Ethernet-ports, and RG-59 cable TV coax connectors. Also, there are wall-plates made with a combination of interfaces, such as RG-59 and Ethernet combinations, or multiple Ethernet combinations in a single wall-plate.

In home and business installations, equipment such as PCs, IP-phones, hubs, and other equipment are installed in racks, on tables, on floors, and under desks. However, the equipment is often connected to Ethernet and receive power separately through a gang-box with a wall-plate. The connections behind the wall-plate are passive, and will consist of a connector terminated to a cable with wires that transition to another part of the building, such as to the electrical circuit breaker box or to a network hub. The equipment is then connected to the ultimate peripheral with which the operator is interfacing with, such as a phone-receiver, monitor/screen, keyboard, mouse, or speakers. It is in comparison with existing technology that the disclosure presented herein offers significant improvements.

SUMMARY

According to one embodiment described herein, a computing device includes an Ethernet connector, internal power supply circuitry, and a Central Processing Unit (CPU). The computing device receives power from the network connection via the Ethernet connector. The internal power supply circuitry extracts power from the Ethernet connector and provides it to the CPU. The power extraction may come from wires connected to the Ethernet connector that carry data and power or only power. According to one implementation, the computing device has a housing that encompasses the components described above and is sized for installation within an electrical wall box. The housing may have a display unit, which according to various embodiments may comprise a touch sensitive surface for receiving user input and may be removable and mountable without the use of removable fasteners.

According to a further embodiment described herein, a computing device provides processing capabilities utilizing a discreet form factor and power from an Ethernet connection. The computing device includes an Ethernet connector that is operative to receive power and to communicate data between the computing device and one or more network devices. Internal power supply circuitry extracts power from the Ethernet connector. A CPU receives the power from the internal power supply circuitry. A housing is included, which is configured for installation within an electrical wall box. The housing may include a display unit having a touch sensitive surface for receiving user input. Additionally, the Ethernet connector may be exposed through a rear side of the housing such that it is not visible or accessible from a front side of the housing.

According to yet another implementation described herein, a system is provided for controlling peripheral devices. The system includes two computing devices. The first computing device includes an Ethernet connector for receiving power and for communicating with the second computing device. The first computing device additionally includes internal power supply circuitry for extracting power from the Ethernet connector and a CPU operative to receive the power from the internal power supply circuitry. A housing encompasses these components and includes a display. The housing is configured for installation within an electrical wall box. When installed, the display is exposed, but the Ethernet connector is not.

The second computing device includes an Ethernet connector for receiving power and communicating with the first computing device. Internal power supply circuitry extracts power from the Ethernet connector and provides the power to a CPU. The second computing device also includes a housing that is configured for installation within an electrical wall box. This housing may include a number of peripheral connectors for connecting the second computing device to peripherals. The peripheral connectors are exposed when the housing is installed within the electrical wall box, but the Ethernet connector is not. According to one implementation, the first CPU may receive a user input from the display and transmit instructions to the second computing device via the Ethernet connectors. The second computing device then receives and executes the instructions.

These and various other features as well as advantages, which characterize the disclosure presented herein, will be apparent from a reading of the following detailed description and a review of the associated drawings.

DETAILED DESCRIPTION

Embodiments will now be described more fully hereinafter with reference to the accompanying drawings, in which preferred embodiments of the invention are shown. This disclosure may, however, be embodied in many different forms and should not be construed as limited to the embodiments set forth herein; rather, these embodiments are provided so that this disclosure will be thorough and complete, and fully convey the scope of the disclosure to those skilled in the art. Like numbers refer to like elements throughout all figures.

Figure 1:
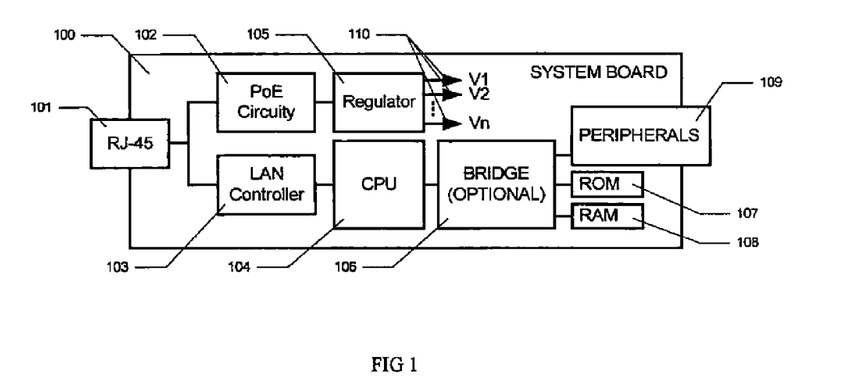
FIG. 1 is a block diagram of an apparatus powered through the Ethernet connector according to one embodiment disclosed herein.

Referring now to FIG. 1, the block diagram of an apparatus 100 is shown according to one embodiment. Although the block diagram is simplified and contains blocks that could be combined, it should be understood that blocks could be further combined and expanded while maintaining the advantageous features of the apparatus. As this description intends to simplify the disclosure for clarity, those skilled in the art would appreciate that the product could be enhanced with additional blocks and peripherals without changing the fundamental advantages of the embodiments presented herein.

The apparatus shown in FIG. 1 contains an RJ-45 modular jack connector 101, typically found in Ethernet products, such as computers and network hubs. This connector typically has a built in transformer consisting of a magnetic core with separate windings for each conductor pair. The PoE circuitry 102 is connected to unused pairs of the connector 101, and/or used pairs depending on the method used for carrying power over the Ethernet cable. The circuitry 102 may contain protection elements for voltage spikes, power conditioning, rectification of voltage, isolation circuitry including a transformer, voltage regulation components and current limiting and over current protection circuitry.

The Regulator 105, contains one ore more semiconductor components necessary to change the voltage outputted by the PoE circuitry 102 to voltages suitable for the various components of the system board 100. Typical voltages needed to drive common electronic components such as Random Access Memory (RAM) 108, Read Only Memory (ROM) 107, the CPU 104, the LAN Controller 103 and other peripherals 109 are 5V, 3.3V, 1.8V and 1.5V, but other custom voltages could be needed i.e., a negative voltage to drive an LCD display (not shown).

The CPU 104 is the main controller for the product and could be an X86 processor, such as the Intel i386, i486, Pentium I, Pentium II, Pentium III, Pentium IV, Pentium V, processors from AMCC such as the EP405, Hitachi SH3 and SH4, processors from Motorola such as COLDFIRE, Intel XSCALE, POWERQUICC from Freescale Semiconductor, or other similar processors. The LAN controller 103 contains the necessary interface to drive and receive signals from the network, and communicate these to the rest of the system through the CPU 104. The Bridge 106, is optional depending on architecture and is often required as a transitional component between the CPU and other peripherals, particularly in Intel architectures.

The ROM 107 may be a flash-ROM, EEPROM, or other non-volatile semiconductor component where the main program and data is stored. The RAM 108 is used by the CPU 105 for temporary storing data or executable code for faster access as compared to the ROM 107. The peripherals block 109 contains conventional interface components such as serial, parallel, USB, FIREWIRE ports, components to interface displays, user input devices, and wireless communications devices. It should be understood that the devices described herein may also have wireless connectivity to a network or other wireless device through a built in antenna, an antenna embedded as circuit board traces, an external port for attaching an antenna or an antenna directly attached to the product. This wireless connectivity could be BLUETOOTH, WiFi, Wireless USB, Universal Wide Band, ZIGBEE, or other wireless standards.

Figure 2:
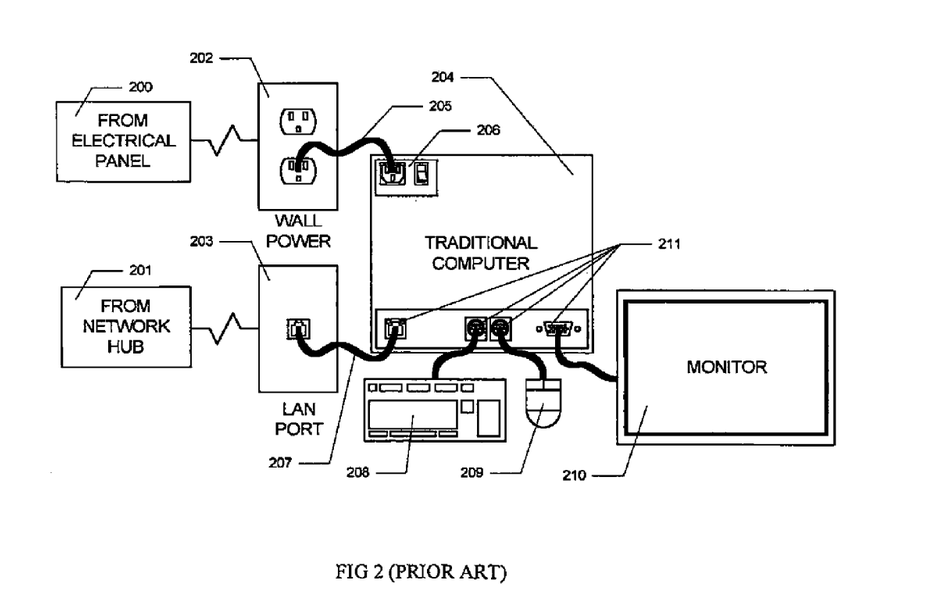
FIG. 2 is a connection diagram illustrating how a computer traditionally is connected to power, network, and peripherals.

FIG. 2 shows the prior art, where a conventional computer 204 with typical connections such as power 205 from the power supply 206 to wall power 202, which ultimately comes from the electrical panel 200, Ethernet 207 from the peripheral ports 211 going to a wall plate 203 and ultimately going to a network hub 201, connections to keyboard 208, mouse 209, and a local monitor 210.

Figure 3:
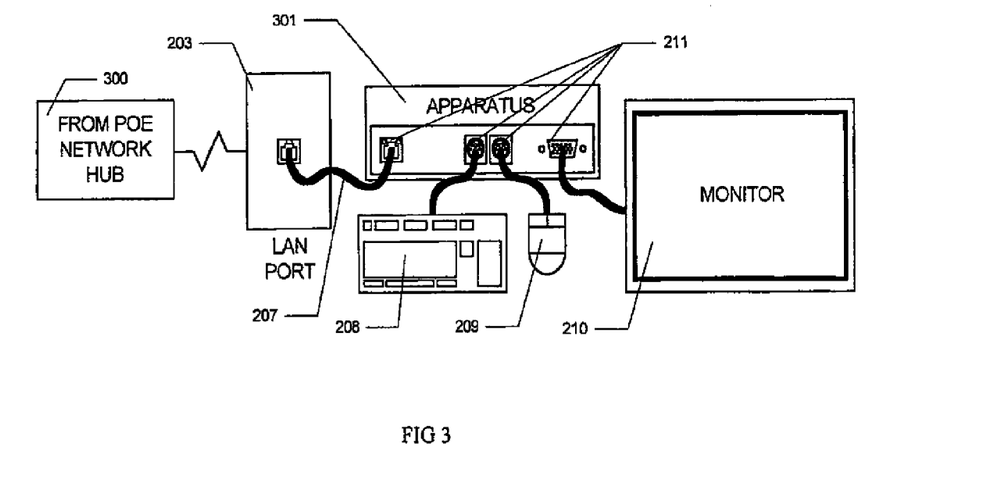
FIG. 3 is a connection diagram illustrating how an apparatus disclosed herein is powered through Ethernet and connected to peripherals according to one embodiment.

FIG. 3 shows one embodiment where the apparatus 301 described herein is connected through its peripheral ports 211 to an Ethernet wall plate 203 through a LAN cable 207, to a keyboard 208, to a mouse 209, and to a local monitor 210. The power for the apparatus 211 is derived through the LAN cable 207 which is ultimately connected to a network hub 300 capable of supplying power to the apparatus 211 through the LAN cable 207. Notice that there is no connection for power to apparatus from an external power source other than the Ethernet port, which is an integral part of this invention. It should be appreciated that the apparatus 301 may include a battery for use when the power supplied to the apparatus via the LAN cable 207 is interrupted. The battery may receive its charge via the LAN cable 207 until power is interrupted, at which time the battery may provide the power required by the apparatus 301 to the corresponding components.

Figure 4:
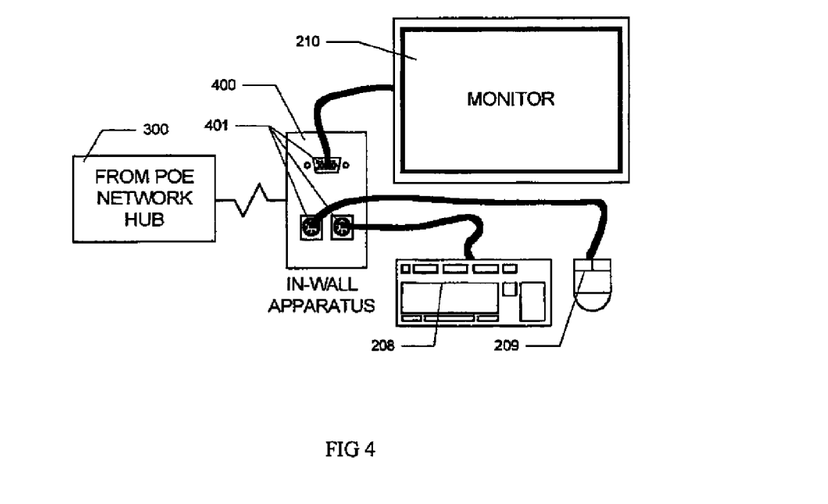
FIG. 4 is a connection diagram illustrating how the apparatus described herein is designed into a electrical wall box, powered through Ethernet, and connected to peripherals according to one embodiment.

FIG. 4 shows one implementation wherein the apparatus 400 is enclosed and built into an electrical wall box, or gang-box. Peripheral connections 401 are available through the wall plate for connections to an external monitor 210 or other display device, such as a TV or flat-panel TV, a keyboard 208, a pointing device, such as a mouse 209. In this particular embodiment the network connection, ultimately going to a power delivery capable hub 300, is done through the back of the apparatus.

By comparing FIG. 2 (prior art) and FIG. 4, the simplicity, aesthetics, reduction of cabling and equipment visible would be appreciated by consumers as well as those skilled in the art. Although FIG. 2 illustrates connections to Human Input Devices (HIDs) such as a keyboard 208 and a mouse 209, these devices could be easily be replaced with existing products that are wireless, such as remote controls and wireless HIDs further enhancing the visual and practical appeal of this implementation. The connections to a typical PC before the disclosure presented herein would take up two gang-box spaces, one for the Ethernet port and one for power. With the embodiments described herein, the PC could be built into a unit that installs into the wall box itself, and space, cabling, cost, and power is saved, which also increases its aesthetic appeal and usefulness in smaller applications.

Figure 5A:
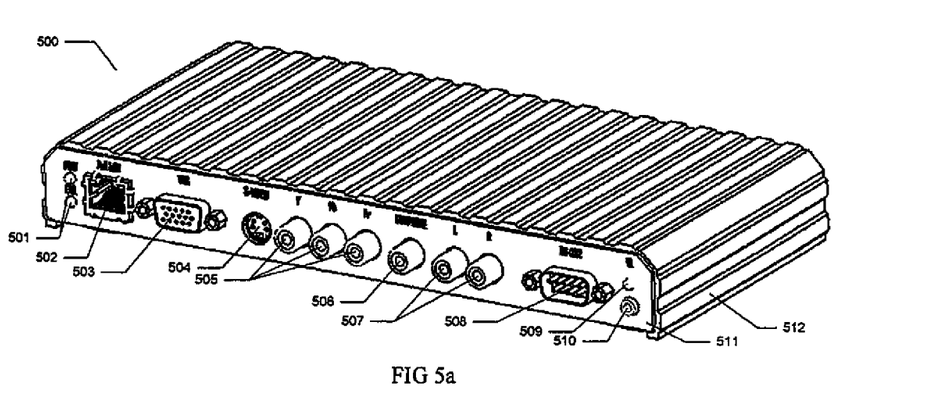
FIGS. 5a and 5b shows isometric and front views of one embodiment described herein, equipped with IO ports targeting video and audio streaming applications.
Figure 5B:
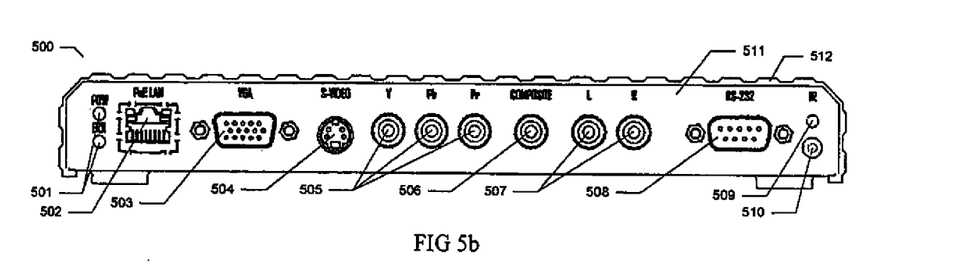

FIGS. 5a and 5b shows respectively isometric views and a front view of one particular implementation in which the apparatus 500 is targeting an audio/video distribution application, as could be found in a future home where a central media server is providing multimedia content to devices throughout the residence using powered Ethernet cables. This device 500 would then reside near a display and audio equipment such as a TV with built in speakers, and would be directly connected to this equipment through its peripheral ports. This particular mode of the embodiment is shown as to sheet metal halves 511 and 512 that are assembled and fastened around a circuit board, internal to the enclosure formed by the top housing 512 and the bottom housing 511. It should be understood that the enclosure of this embodiment could be sheet metal, extruded aluminum, plastic, or any other material. Additionally, it should be appreciated that since not all Ethernet ports provide power, the apparatus could additionally have a traditional power adapter, wall adapter input or internal power supply.

Light Emitting Diodes (LEDs) 501 indicates the operational status of the device, the LAN port 502 is the connection to Ethernet and power source for the device according to the disclosure presented herein. The device 500 could have the same input and output ports as typically found on a PC, such as connector for video output (VGA), serial ports, parallel ports, keyboard and mouse (PS/2), USB, and audio connectors. Additionally the device 500 may have ports not commonly found on PCs such as a composite video output, component video output, infrared port, and direct output to speakers. The composite/component video and direct speaker outputs are useful in multimedia installations where the device is used as part of an audio/video distribution system.

The embodiment shown in FIGS. 5a and 5b show a variety of parallel video outputs so that one particular product realized from this disclosure could be used in a variety of installations, such as instances where the apparatus drives a VGA-monitor through the VGA-connector 503, a flat-panel LCD-TV through is S-Video port 504, a home theater video projector through its component video connectors 505, or conventional TV through its composite video connector 506. Note that one or more of these video outputs could be used simultaneously. Connections to an audio system are made through line RCA-jacks 507. Since many video display products also contain speakers, a connection would typically be made from the apparatus to both video and audio inputs of a device, such as a TV with built in speakers. The apparatus described herein features ports to control functions of the device to which they are connected through standard interface methods. In particular these are an RS-232 serial port 508, often found on high-end plasma screen TVs, an Infra Red (IR) LED 509 to send command to devices capable of being controlled with conventional remote controls, and a connector for connecting an external IR-LED in those cases where the built in LED 509 cannot provide a visibly direct path to the equipped it is intended to control.

Figure 6A:
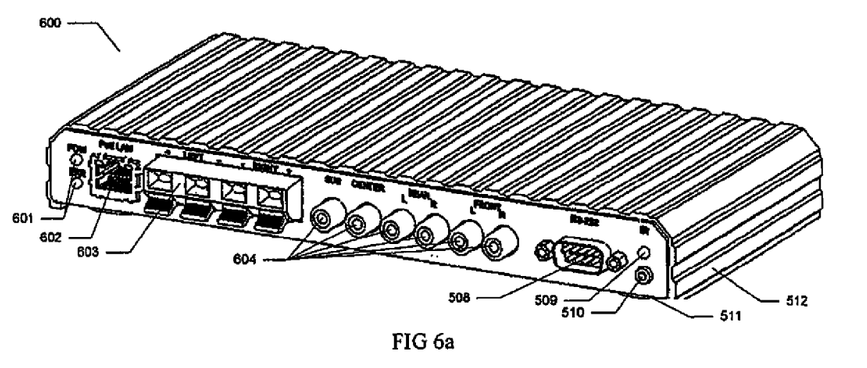
FIGS. 6a and 6b shows isometric and front views of one embodiment equipped with IO ports targeting surround audio streaming applications.
Figure 6B:
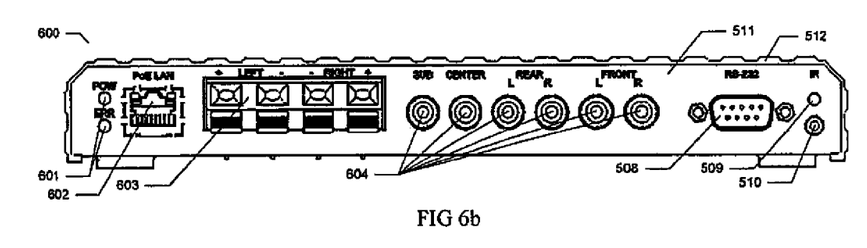

FIGS. 6a and 6b shows respectively isometric views and front view of one implementation in which the apparatus 600 is targeting an audio application, as could be found in a future home where a central media server is providing audio content to devices throughout the residence using powered Ethernet cables. This device 600 would then reside near the audio equipment such as an amplifier, a speaker, or a pair of speakers, and would be directly connected to this equipment through its peripheral ports. This particular mode of the embodiment is shown as to sheet metal halves 511 and 512 that are assembled and fastened around a circuit board, internal to the enclosure formed by the top housing 512 and the bottom housing 511. LEDs 601 indicate the operational status of the device, the LAN port 602 is the connection to Ethernet and power source for the device. The embodiment shows a variety of parallel audio outputs so that one particular product realized based on this invention could be used in a variety of installations, such as instances where the apparatus drives a pair of stereo speakers directly through quick release connectors 603, a home theater audio surround system through the stereo front, stereo rear, and center and sub connectors 604. Note that one or more of these audio outputs could be used simultaneously. The apparatus described herein features ports to control functions of the device to which they are connected through standard interface methods.

Figure 7:
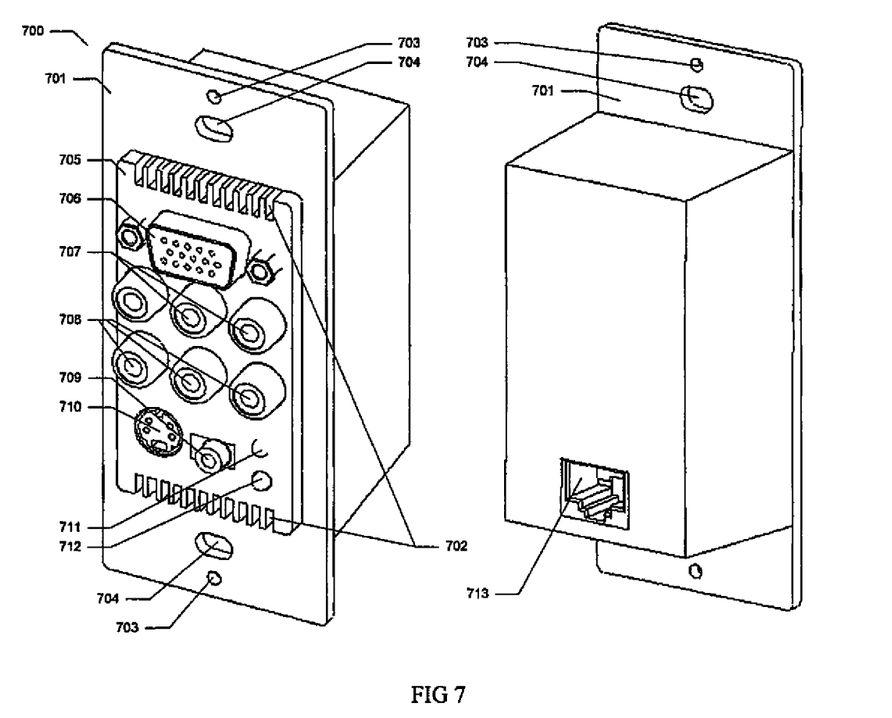
FIG. 7 illustrates front and rear isometric views of one embodiment showing installation of a device into an electrical wall box according to the disclosure presented herein.

FIG. 7 shows an isometric view of one embodiment wherein the computing device 700 may be connected to any number of peripherals. A housing is shown consisting of a mountable front plate 701 with a housing compartment for containing the electronics, and a protruding portion 705 that is designed to fit conventional wall plates, often referred to a Decora-style wall plates. In this particular installation mode, peripheral connectors are shown for VGA 706, component video 707, composite video and stereo audio 708, and S-Video 710. A built in IR-LED 711 in parallel with a connector 709 can be used to control external equipment. An additional LED 712 is used for status indication of the apparatus. A LAN-port 713 is found on the back of the product and provides both power and network connectivity to the apparatus. When the product is installed into an electrical wall box, it is fastened by installing screws through openings 704 in the housing front plate 701.

After installation, a wall plate can be installed over the product covering up the screws that fasten the product to the wall box. The wall plate is mounted with cosmetic screws or snap-in hardware through holes 703. In the protruding part of the housing 705 there may be ventilation ridges 702 that are openings at the top and bottom of the protrusion where airflow can circulate through to cool internal components. It should be appreciated that prior to the disclosure provided herein, PCs could still be mounted on walls and in ceilings using brackets, and then connected to its peripherals. However, with this particular embodiment, the PC resides inside the wall box itself, and peripherals are terminated to connectors protruding the cover pate of the wall box.

Figure 8:
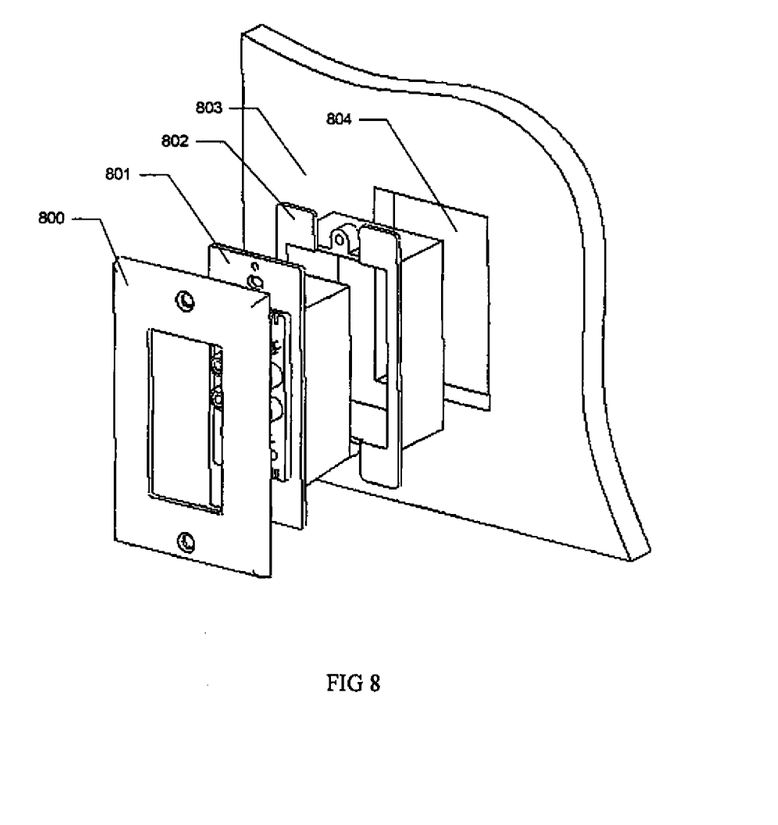
FIG. 8 is an exploded view wherein a device according to the disclosure herein is installed into an electrical wall box within drywall and outfitted with a standard wall plate.

FIG. 8 illustrates how one implementation 801 could be installed in a typical wall installation. A hole 804 is cut-out in the drywall 803 and an electrical wall box 802 is installed through the opening, and secured to the drywall with anchors typically included as part of the wall box accessories. The apparatus described herein 801 is installed into the electrical box with screws or snap-in fasteners. Then, a finishing wall plate 800 is finally installed and secured to the apparatus with screws of snap-in fasteners.

The particular mode of installation showing the apparatus used in a single electrical wall box is done for simplicity of illustration only. The apparatus shown could equally well be installed in electrical wall boxes targeted for any number of integer units, such as the apparatus installed in a double or triple wall box, where one or two open cavities are available for other equipment or more instances of the apparatus.

Figure 9A:
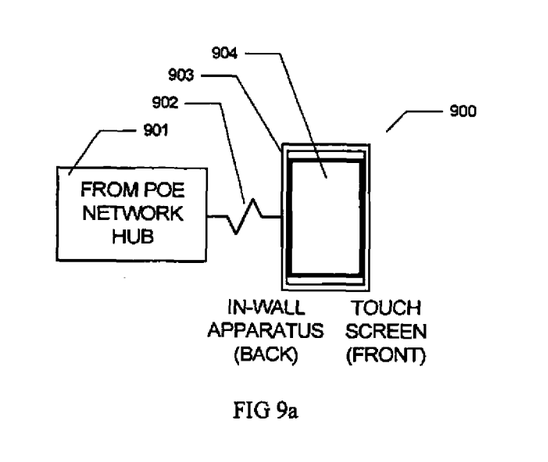
FIG. 9a shows an illustration of one embodiment as seen in FIG. 4, but with the monitor, keyboard and mouse replaced by a touch panel mounted over the apparatus.

FIG. 9*a* shows an illustration of another embodiment 900, similar to the concept from FIG. 4, but where the monitor 210, keyboard 208 and mouse 209 has been replaced with a touch panel 904 and mounted over the apparatus 903. A network connection also carrying power 902 ultimately connects the apparatus to a network hub 901.

Figure 9B:
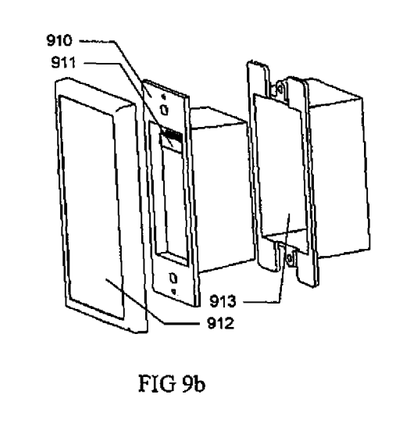
FIGS. 9b and 9c show exploded views of one embodiment installed in a single and double electrical wall box respectively.
Figure 9C:
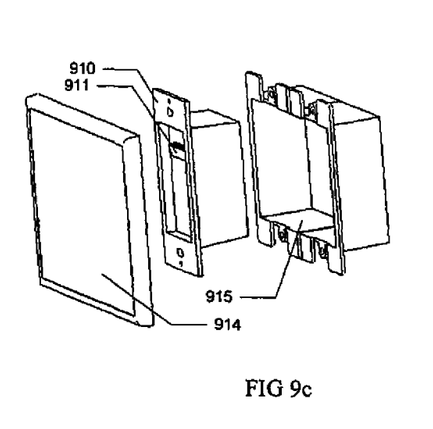

FIGS. 9*b* and 9*c* shows the same embodiment as from FIG. 9*a* in two exploded views, where the apparatus 910 is installed into single 913 or double 915 electrical wall boxes respectively. The apparatus 910 is outfitted with a connector 911 that connects to the single touch panel 912 or double touch panel 914 through a cable (not shown). This allows for easy installation and removal. The apparatus is installed and secured into the wall box with screws or snap-in fasteners. The touch panel is then mounted onto the apparatus with matching snap-in features on the panel and apparatus. Using snap-in features, as opposed to screws, allows for quicker install, increases the visible area on the display, and improves the aesthetics of the product by now showing the screw heads. Additionally, the touch panel 904 may include a backlight for viewing in reduced light environments. The backlight may be varied in color and intensity to allow for the apparatus 910 to function as a nightlight. The CPU receives control requests for the backlight through the touch panel 904 and alters the power to one or more lights that create the backlight in order to control the intensity and color according to the user request.

According to an additional embodiment, an apparatus may include a motion sensor connected to the CPU. When movement is detected at a certain proximity from the apparatus, the motion sensor may trigger the CPU to execute a stored instruction. This and other instructions may be stored within memory associated with the apparatus. Various instructions may exist for various proximities. For example, if the apparatus detects that a user walks within a certain distance, lights will be turned on. As the user gets closer, the stereo or television may be turned on.

It is important to realize that embodiments described herein may span a multiple of wall box cavities, allowing more room for peripheral connections, more room internally for circuitry, and improving the area available for the display. It should be appreciated that a series of product combinations could be developed where customers could mix and match units across multiple wall boxes to achieve particularly useful applications. One such combination of multiple embodiments could be an installation in a room where on one wall an apparatus with a display is installed in a single wall box. In the same room, another wall box could be installed behind a TV containing another apparatus with video outputs. In the same room, a third wall box could be installed in the ceiling with audio outputs connected to speakers directly. The system could then be programmed in such a way that the three apparatuses communicate over the Ethernet to produce video and audio based on the interaction with the touch panel.

Figure 10A:
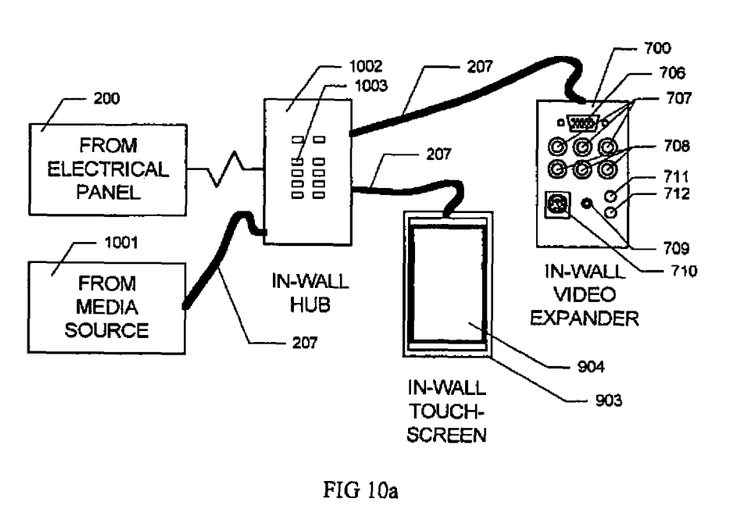
FIG. 10a illustrates an apparatus network according to one embodiment.
Figure 10B:
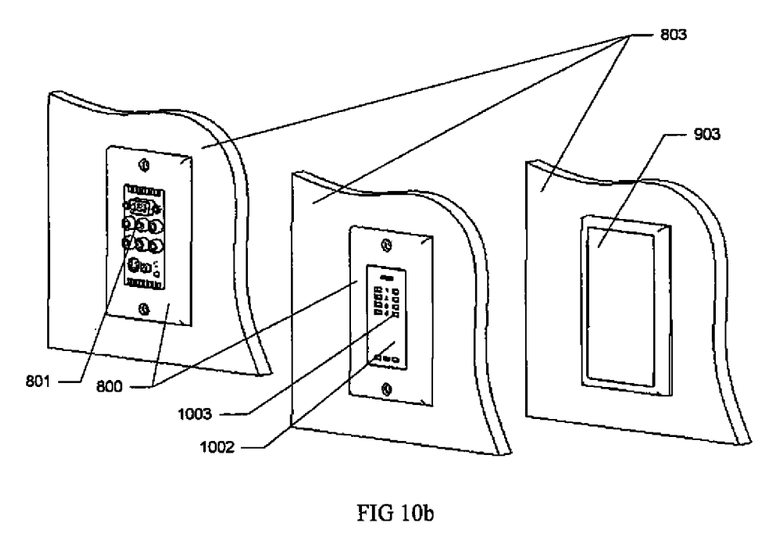
FIGS. 10b and 10c illustrate front and rear views respectively of the apparatus network of FIG. 10a when mounted within a wall according to one embodiment.
Figure 10C:
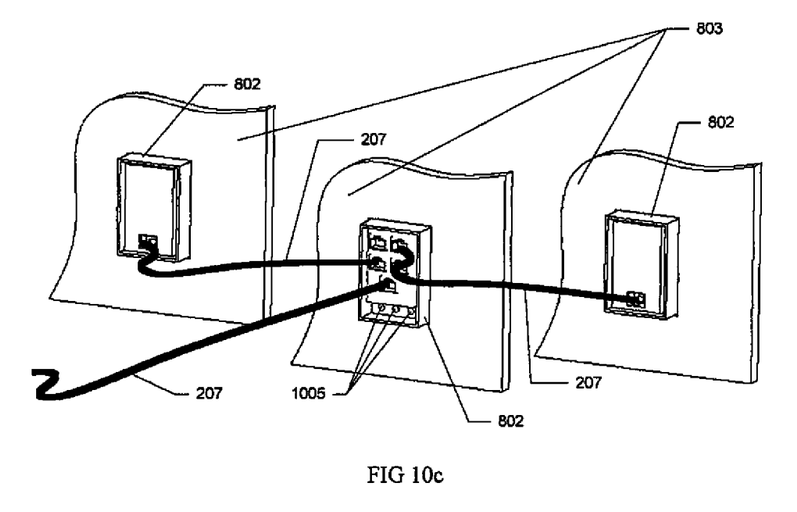

FIGS. 10*a*-10*c* show an implementation in which a computing device 903 with a touch panel 904 attached is used to control peripherals that are attached to the computing device 700. According to this implementation, the computing device 903 communicates with the computing device 700 via an in-wall Ethernet hub 1002 and LAN cables 207. The Ethernet hub 1002 may include LEDs 1003 for indicating connection status of various Ethernet ports located on the rear of the hub. The Ethernet hub 1002 may receive power from an electrical panel 200 and may be connected to a media source 1001. Utilizing the touch panel 904 in one room of a house, a user may instruct the computing device 700 in another room of a house to play media content from the media source 1001 using peripherals, such as speakers and a display, that are attached to the computing device 700 via any number and type of peripheral connectors.

FIGS. 10*b* and 10*c* show front and rear views of the computing devices 700 and 903. As can be seen in FIG. 10*b*, the computing devices 700 and 903, as well as the Ethernet hub 1002, are flush mounted within drywall 803. Cover plates 800 cover the computing device 700 and Ethernet hub 1002. FIG. 10*c* shows a rear view of the computing devices 700 and 903 and the Ethernet hub 1002. Power connections 1005 are shown as screw terminals for providing power to the in-wall Ethernet hub 1002. It can be seen that the computing devices 700 and 903 are mounted within electrical wall boxes 802 and are communicatively linked via LAN cables 207.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A wall mounted computing apparatus comprising:
   an Ethernet connector configured to receive power and data;
   internal power supply circuitry configured to extract the power from the Ethernet connector connected to wires that carry data and power;
   a Central Processing Unit (CPU) configured to receive the power from the internal power supply circuitry;
   a display unit having a touch panel;

a motion sensor, wherein the CPU executes a first instruction when an object is detected by the motion sensor within a first proximity, wherein the CPU executes a second instruction when the object is detected by the motion sensor within a second proximity, the second proximity being different from the first proximity; and a housing encompassing the Ethernet connector, the internal power supply circuitry, the CPU, and the motion sensor, wherein the housing is configured for retrofitting and installation within a standard single electrical wall box of standard double electrical wall boxes that are disposed substantially within a wall, wherein the display unit is configured for retrofitting with the standard double electrical wall boxes.

2. The computing device of claim 1, wherein the display unit is removable and mountable without the use of removable fasteners.

3. The computing device of claim 1, wherein the display unit comprises a backlight and wherein the CPU is operative to control the color and intensity of the backlight.

4. The computing device of claim 1, wherein the display unit is configured to replace monitor, keyboard and mouse of the computing device.

5. The computing device of claim 1, further comprising:
a peripheral port in communication with the CPU; and
a peripheral device attached to the peripheral port, wherein the display unit is configured to transmit user instructions to the CPU, wherein the CPU communicates with the peripheral device in accordance with the user instructions.

6. The computing device of claim 5, wherein the CPU transmits media content from a media source to the peripheral device for playing the media content at the peripheral device based on user interactions with the touch panel.

7. The computing device of claim 6, wherein the peripheral device is a speaker or a display.

8. The wall mounted computing apparatus of claim 1, wherein the first instruction is to turn on a light.

9. The wall mounted computing apparatus of claim 1, wherein the second instruction is to turn on an audio device.

* * * * *